United States Patent
Suzuki

(10) Patent No.: US 9,492,748 B2
(45) Date of Patent: Nov. 15, 2016

(54) VIDEO GAME APPARATUS, VIDEO GAME CONTROLLING PROGRAM, AND VIDEO GAME CONTROLLING METHOD

(75) Inventor: Makoto Suzuki, Tokyo (JP)

(73) Assignee: KABUSHIKI KAISHA SEGA, Tokyo (JP)

( * ) Notice: Subject to any disclaimer, the term of this patent is extended or adjusted under 35 U.S.C. 154(b) by 557 days.

(21) Appl. No.: 13/700,786

(22) PCT Filed: May 19, 2011

(86) PCT No.: PCT/JP2011/061554
§ 371 (c)(1),
(2), (4) Date: Nov. 29, 2012

(87) PCT Pub. No.: WO2011/158599
PCT Pub. Date: Dec. 22, 2011

(65) Prior Publication Data
US 2013/0084982 A1    Apr. 4, 2013

(30) Foreign Application Priority Data
Jun. 14, 2010 (JP) .................. 2010-135609

(51) Int. Cl.
| A63F 13/00 | (2014.01) |
| A63F 13/428 | (2014.01) |
| A63F 13/213 | (2014.01) |
| G06K 9/46 | (2006.01) |

(Continued)

(52) U.S. Cl.
CPC .......... *A63F 13/428* (2014.09); *A63F 13/213* (2014.09); *G06F 3/011* (2013.01); *G06F 3/017* (2013.01); *G06K 9/00369* (2013.01); *G06K 9/4642* (2013.01); *G06K 9/4647* (2013.01); *A63F 2300/1093* (2013.01); *A63F 2300/6045* (2013.01)

(58) Field of Classification Search
CPC .......... G06F 3/011; G06F 3/017; A63F 13/10; A63F 13/22; A63F 13/21; A63F 13/213; G01B 11/22; G06K 9/00335–9/00389; G06T 7/0081
See application file for complete search history.

(56) References Cited

U.S. PATENT DOCUMENTS

| 4,843,568 | A | * | 6/1989 | Krueger et al. | ............... 382/100 |
| 5,454,043 | A | * | 9/1995 | Freeman | ....................... 382/168 |
| 5,563,988 | A | * | 10/1996 | Maes et al. | ................... 345/421 |

(Continued)

FOREIGN PATENT DOCUMENTS

| JP | 10-177449 | 6/1998 |
| JP | 2001-307107 | 11/2001 |

(Continued)

OTHER PUBLICATIONS

International Search Report mailed on Jun. 21, 2011.

*Primary Examiner* — Steven J Hylinski
(74) *Attorney, Agent, or Firm* — IPUSA, PLLC

(57) ABSTRACT

A video game apparatus includes a depth sensor configured to capture an area where a player exists and acquire depth information for each pixel of the image; and a gesture recognition unit configured to divide the image into a plurality of sections, to calculate statistics information of the depth information for each of the plurality of sections, and to recognize a gesture of the player based on the statistics information.

5 Claims, 11 Drawing Sheets (10,87)    (25,82)
(19,91)    (9,93)

(25,82)    (10,87)
(9,93)     (19,91)

(51) Int. Cl.
*G06F 3/01* (2006.01)
*G06K 9/00* (2006.01)

(56) References Cited

U.S. PATENT DOCUMENTS

| | | | | |
|---|---|---|---|---|
| 5,616,078 | A | * | 4/1997 | Oh ................................ 463/8 |
| 5,704,836 | A | * | 1/1998 | Norton et al. ................. 463/36 |
| 6,031,934 | A | * | 2/2000 | Ahmad et al. ................ 382/154 |
| 6,144,366 | A | | 11/2000 | Numazaki et al. |
| 6,195,104 | B1 | * | 2/2001 | Lyons ........................... 345/473 |
| 7,372,977 | B2 | * | 5/2008 | Fujimura et al. ............. 382/103 |
| 7,627,139 | B2 | * | 12/2009 | Marks et al. ................. 382/103 |
| 7,970,176 | B2 | * | 6/2011 | Kutliroff ................ A63F 13/10 382/103 |
| 8,166,421 | B2 | * | 4/2012 | Magal ..................... G06F 3/017 382/218 |
| 8,625,882 | B2 | * | 1/2014 | Backlund ............ G06F 3/04815 345/419 |
| 2002/0050924 | A1 | * | 5/2002 | Mahbub ................. G01S 7/4802 340/426.1 |
| 2002/0168092 | A1 | * | 11/2002 | Doi ........................ A63F 13/10 382/107 |
| 2003/0002033 | A1 | * | 1/2003 | Boman ..................... 356/139.03 |
| 2003/0156756 | A1 | * | 8/2003 | Gokturk et al. ............. 382/190 |
| 2006/0046847 | A1 | | 3/2006 | Hashimoto |
| 2007/0248245 | A1 | * | 10/2007 | Aimura ............... G06K 9/00362 382/104 |
| 2007/0268295 | A1 | * | 11/2007 | Okada ................ G06K 9/00369 345/474 |
| 2008/0019589 | A1 | * | 1/2008 | Yoon .................. G06K 9/00355 382/165 |
| 2008/0123968 | A1 | * | 5/2008 | Nevatia .............. G06K 9/00369 382/228 |
| 2008/0300055 | A1 | * | 12/2008 | Lutnick ................ G07F 17/3209 463/39 |
| 2009/0066490 | A1 | * | 3/2009 | Mitzutani .......... G06K 9/00362 340/435 |
| 2009/0085864 | A1 | * | 4/2009 | Kutliroff et al. ............... 345/156 |
| 2009/0153655 | A1 | * | 6/2009 | Ike .......................... G06F 3/012 348/77 |
| 2010/0104134 | A1 | * | 4/2010 | Wang .................... G06F 3/0304 382/103 |
| 2010/0234094 | A1 | * | 9/2010 | Gagner ................... G07F 17/32 463/20 |
| 2010/0278431 | A1 | * | 11/2010 | Mathe ................ G06K 9/00201 382/190 |
| 2010/0329509 | A1 | * | 12/2010 | Fahn .................. G06K 9/00355 382/103 |
| 2011/0080336 | A1 | * | 4/2011 | Leyvand ................. A63F 13/06 345/156 |
| 2011/0175809 | A1 | * | 7/2011 | Markovic ............... A63F 13/06 345/158 |
| 2013/0107021 | A1 | * | 5/2013 | Maizels ................ G06T 19/006 348/50 |

FOREIGN PATENT DOCUMENTS

| | | |
|---|---|---|
| JP | 2002-008041 | 1/2002 |
| JP | 2002-123834 | 4/2002 |
| JP | 2004-333505 | 11/2004 |
| JP | 2006-068315 | 3/2006 |
| JP | 2006-235771 | 9/2006 |
| JP | 2009-064199 | 3/2009 |

* cited by examiner

IMAGE INFORMATION 109

DEPTH INFORMATION 110

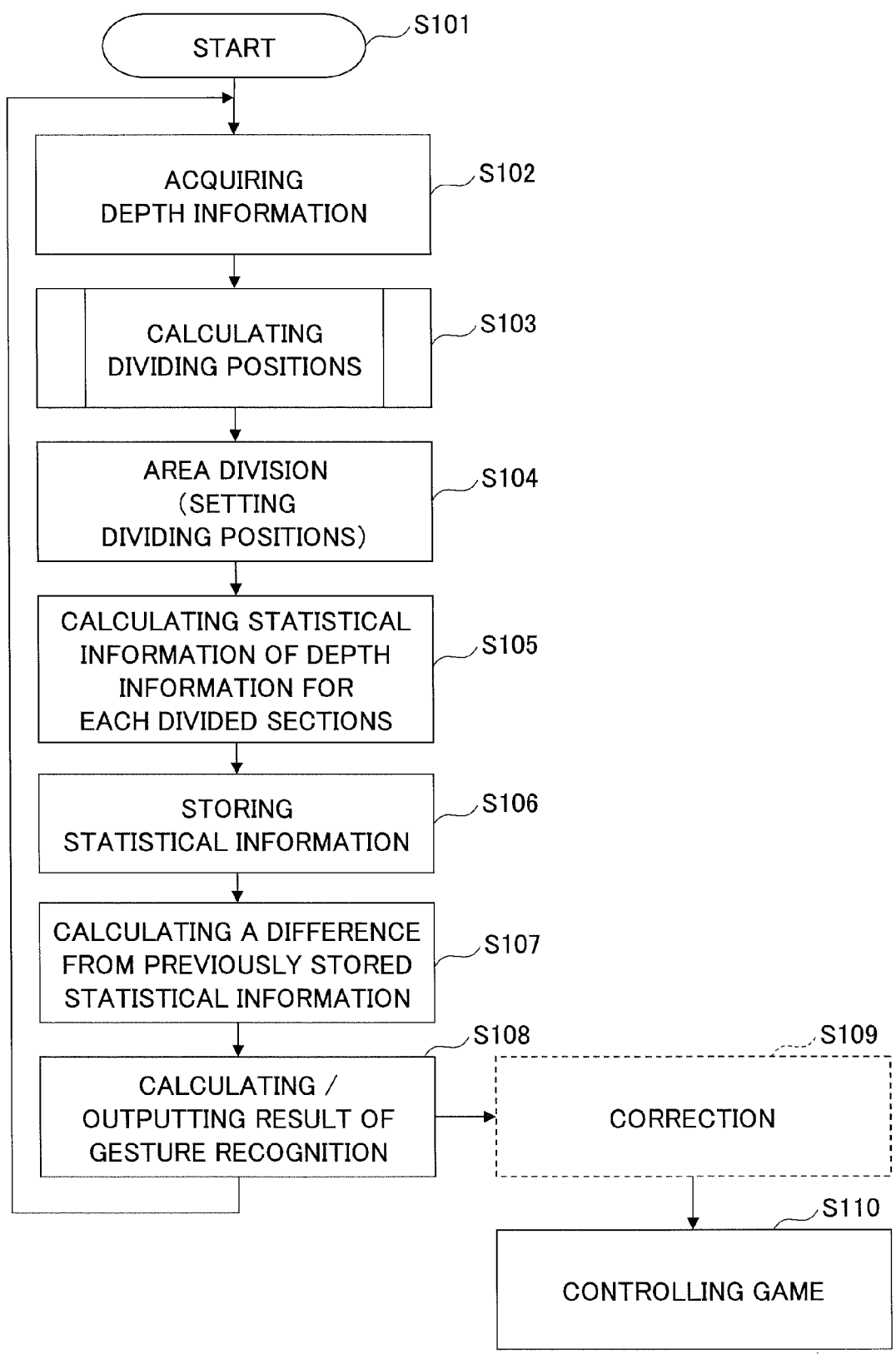

(16,87)　　　　　　　　　(15,80)

(12,91)　　　　　　　　　(15,95)

(30,88)　　　　　　　　　(10,79)

(8,93)　　　　　　　　　(20,96)

(+14,+1)　　　　　　　　(−5,−1)

(−4,+2)　　　　　　　　(+5,+1)

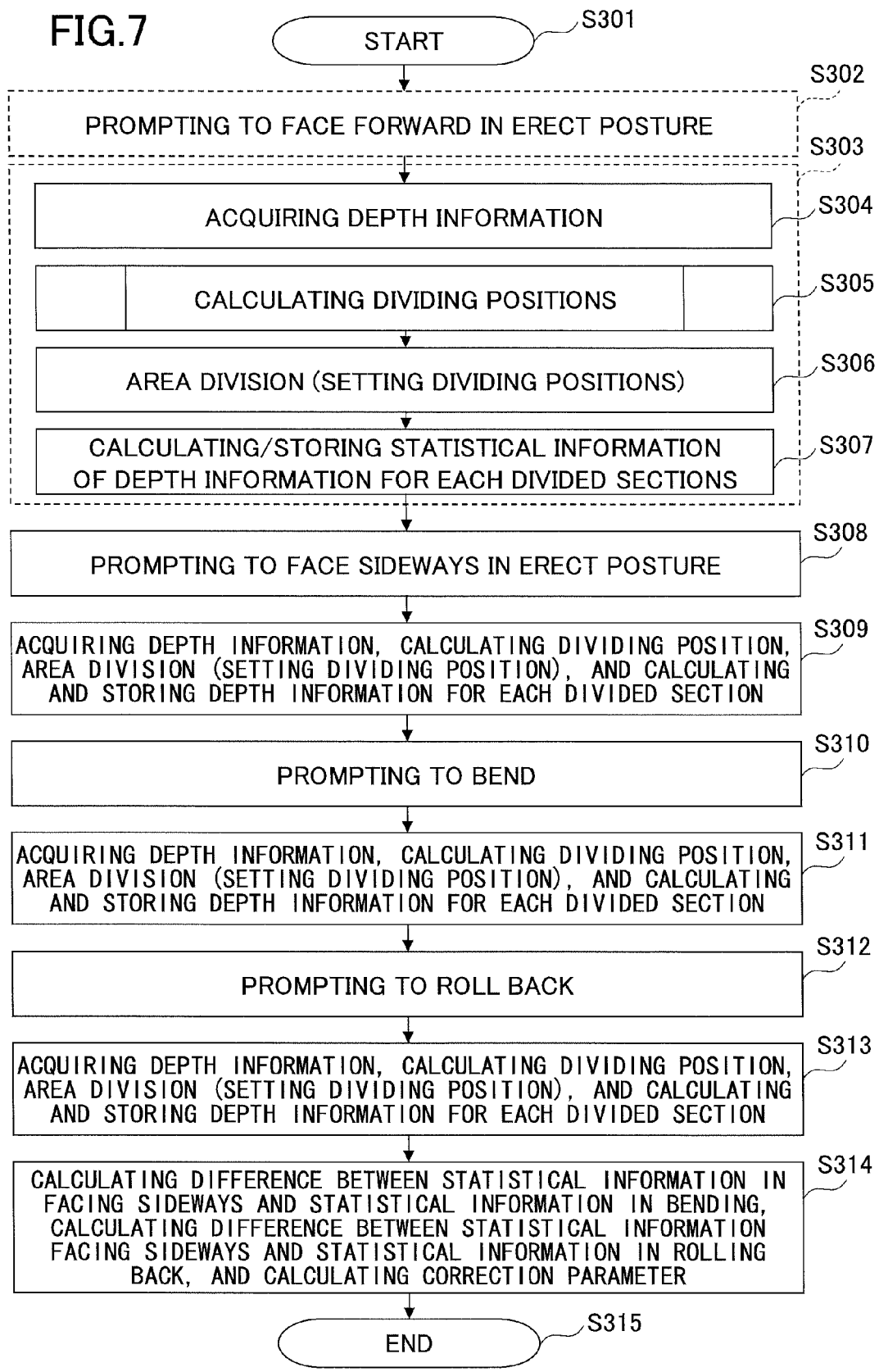

(20,89)                 (18,90)

(11,96)                (10,95)

(16,87)   (15,80)

(12,91)   (15,95)

(15,80)   (16,87)

(15,95)   (12,91)

(30,88)  (10,79)

(8,93)  (20,96)

(10,79)  (30,88)

(20,96)  (8,93)

(10,87) (25,82)

(19,91) (9,93)

(25,82) (10,87)

(9,93) (19,91)

VIDEO GAME APPARATUS, VIDEO GAME CONTROLLING PROGRAM, AND VIDEO GAME CONTROLLING METHOD

TECHNICAL FIELD

The present invention relates to a video game apparatus, a video game controlling program, and a video game controlling method.

BACKGROUND

There is proposed a new way of controlling a game progression in a video game apparatus using gestures (including postures, gests or the like) by a player instead of controlling of a controller by the player. There is proposed a technique of in, for example, Patent Document 1 or the like by a game operation using poses or gestures of a player.

In the above new way of the video game apparatus, a technique called bone structure tracking is used to recognize gestures of the player and realize a game progression corresponding to the recognized gestures. The bone structure tracking is a technique of recognizing a characteristic end (a head, an arm, a body, a leg or the like), assumes positions of a bone (ossis) and a joint (arthro) inside the characteristic end, and tracks a motion of the bone and the joint based on information of postures of the player acquired by a camera or a depth sensor (i.e., an instrument which measures distances between a sensor of a camera and each position on an object to be captured by the camera).

[Patent Document 1] Japanese Laid-open Patent Publication No. 2006-68315

DISCLOSURE OF THE INVENTION

Problems to be Solved by the Invention

The above bone structure tracking effectively functions in a case where a player faces forward relative to the camera or depth sensor and the entire body of the player is substantially captured. However, in a case where the player faces sideways, the bone structure tracking may not stably function so as to be unsuccessfully completed. This is because, in this case, many portions of the body of the player such as the arm, hand, leg, ankle, or the like on a side opposite to the camera cannot be observed from the camera or depth sensor.

The embodiments of the present invention are provided to solve the above problems. The object of the present invention is to provide a video game apparatus which can accurately recognize gestures of a player regardless of the direction of the player relative to the depth sensor.

Means for Solving Problems

In order to solve the above problems, according to the first aspect of the present invention, there is provided a video game apparatus or the like including a depth sensor configured to capture an area where a player exists and acquire depth information for each pixel of the image; and a gesture recognition unit configured to divide the image into a plurality of sections, to calculate statistics information of the depth information for each of the plurality of sections, and to recognize a gesture of the player based on the statistics information.

In order to solve the above problems, according to the second aspect of the present invention, the gesture recognition unit calculates an area center of a silhouette of the player in the image and divides the image into the plurality of sections.

In order to solve the above problems, according to the first aspect of the present invention, the gesture recognition unit prompts the player to take a plurality of postures and calculates a correction parameter for individual postures.

Effect of the Invention

According to the video game apparatus of the embodiment of the present invention, gestures of a player can be accurately recognized regardless of the direction of the player relative to a depth sensor.

BRIEF DESCRIPTION OF DRAWINGS

FIG. 3 is a flow chart illustrating exemplary processes of gesture recognition and game control.

FIG. 7 is a flowchart illustrating an exemplary process of calculating a correction parameter.

BEST MODE FOR CARRYING OUT THE INVENTION

In order to avoid instability in the bone structure tracking described in the above patent document 1, it is possible to add a dead zone to the calculation. However, if a slight change in the posture, a weight shift or the like may be missed. In this case, the bone structure tracking is not applicable to the video game requiring delicate control. For example, in a video game operable by gestures of a player to control a surf board, a skate board or the like, the face of a player faces right or left by 90 degrees relative to the camera or the depth sensor and the body of the player faces sideways in playing the game. In such a video game operated by gestures of the player, there may be a case where a slight change in the posture, a weight shift or the like is missed in measuring a body member positioned opposite to a camera or a sensor because a slight change in the posture or a slight weight shift is detected.

Therefore, it is important to accurately recognize the gestures of the player irrespective of the direction of the player relative to the depth sensor.

Hereinafter, embodiments of the present invention are described in detail.

<Structure>

Figure 1:
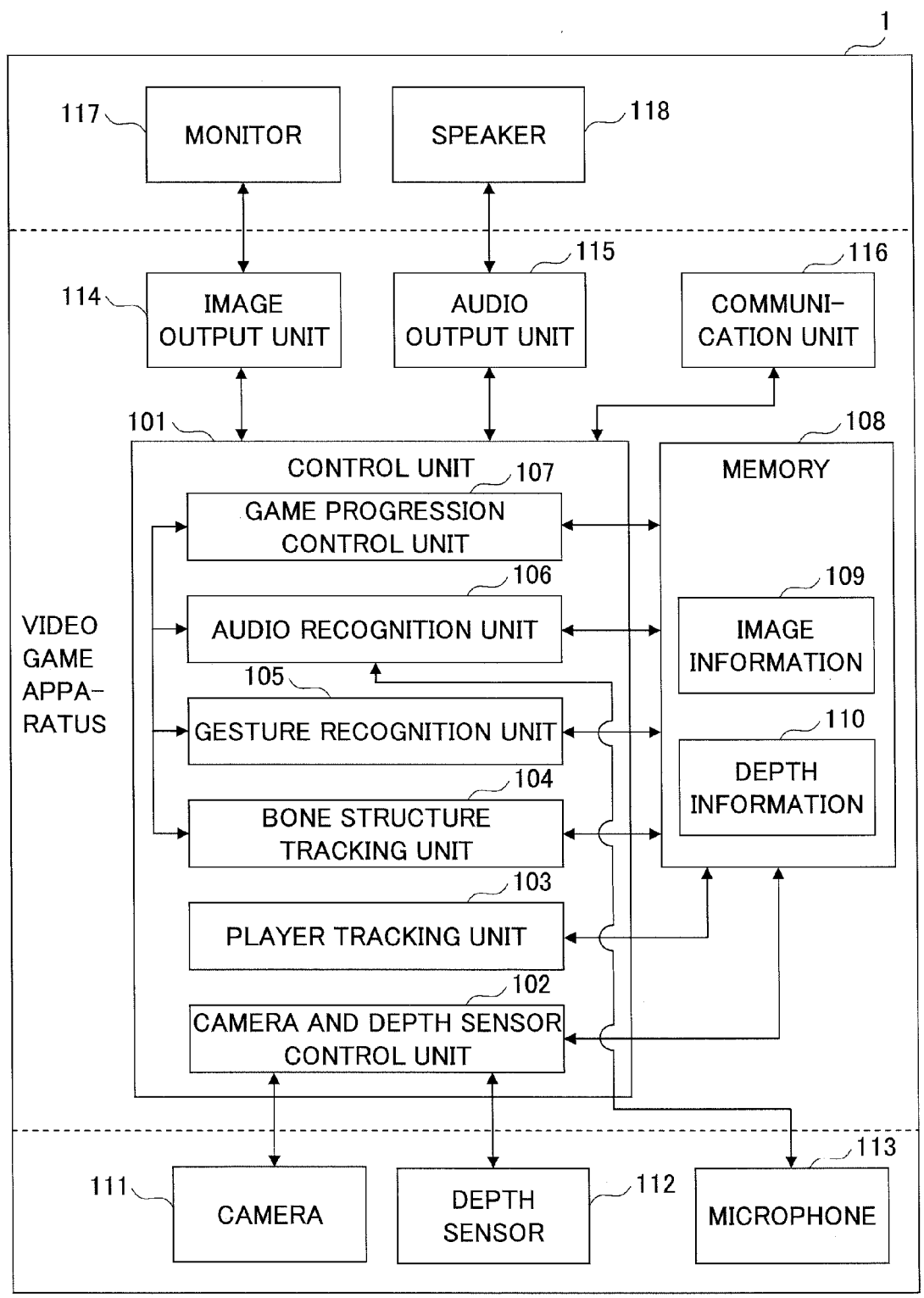
FIG. 1 illustrates a structure example of a video game apparatus of a first embodiment of the present invention.

FIG. 1 illustrates a structure example of a video game apparatus of a first embodiment of the present invention.

Referring to FIG. 1, the video game apparatus 1 includes a control unit 101, a memory 108, a camera 111, a depth sensor 112, a microphone 113, an image output unit 114, an sound output unit 115, a communication unit 16, a monitor 117, and a speaker 118. The camera 111, the depth sensor 112, the monitor 112, and the speaker 118 are illustrated so as to be included in the video game apparatus 1. However, the camera 111, the depth sensor 112, the monitor 112, and the speaker 118 may be provided outside the video game apparatus 1 and connected to the video game apparatus 1 by a cable or the like.

The control unit 101 is formed by a central processing unit (CPU) or the like. The control unit performs a main control operation in conformity with a computer program.

The memory 108 stores data as a work area for the control unit 101.

The camera 111 captures an image of a space where a player exists acquires to acquire image information. The data structure is described later.

The depth sensor 112 emits an infrared light or the like into the space where the player exists and captures an image of the space. Then, the depth sensor 112 acquires depth information (distance information) for each pixel of the captured image (e.g., FIGS. 5A, 5B, and 5C) from a time (a flying time) between transmission of the infrared light and receipt of the infrared light. The data structure is described later.

The microphone 113 receives sound from a space where the player ordinarily exists.

The image output unit 114 generates an image signal to be output to the monitor 117.

The sound output unit 115 generates a sound signal to be output to the speaker 118.

The communication unit 116 performs wired or wireless data transmission with another apparatus or a network.

Meanwhile, the control unit 101 includes, as a functional unit, a camera and depth sensor control unit 102, a player tracking unit 103, a bone structure tracking unit 104, a gesture recognition unit 105, a sound recognition unit 106, and a game progression control unit 107.

Figure 2A:
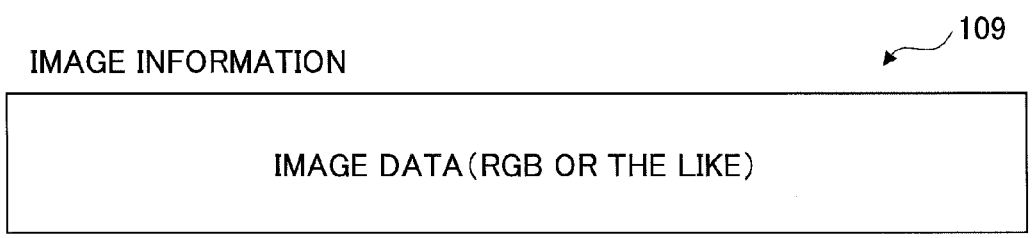
FIG. 2A illustrates an exemplary data structure of image information.
Figure 2B:
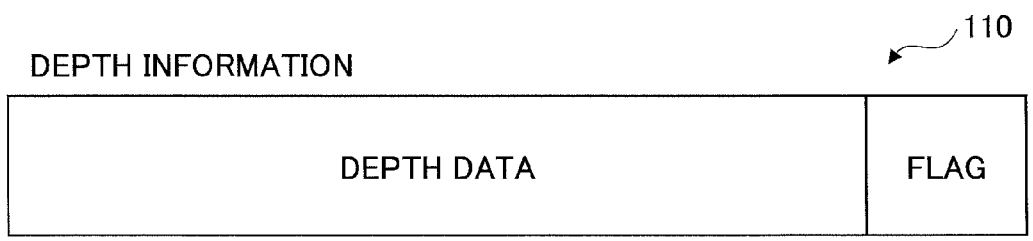
FIG. 2B illustrates an exemplary data structure of depth information.

The camera and depth sensor control unit 102 controls the camera 111 and the depth sensor 112, and stores image information 109 captured by the camera 111 and the depth information 110 acquired from the depth sensor 112 in the memory 108. As illustrated in FIG. 2A, the image information 109 is image data of Red, Green, and Blue (RGB) for each pixel. As illustrated in FIG. 2B, the depth information 110 and the flag indicative of the player corresponding to the depth data are stored in the memory 108. The depth information 110 indicates the distance between the depth sensor 112 and the surface of an object to be measured. The flag is, for example, "1" for player #1, "2" for player #2, and "3" for another object. The depth information 110 and the flag are stored in correspondence with each pixel of the captured image. The flag of the depth information is set by the player tracking unit 103. There is no value in the flag of the depth information when the depth data are acquired from the depth sensor 112. The resolution of the image information 109 may not be the same as the resolution of the depth information 110.

Referring back to FIG. 1, the player tracking unit 103 tracks the depth information 110 stored in the memory 108 (when necessary, it may be the image information 109), and sets the flag for identifying the players. For example, after recognizing that the player is a specific player (the layer #1 or player #2) using the gestures, a silhouette (a portion recognized as a foreground rather than a background) of the specific player is tracked. Then, the flag indicative of the specific player is set in the depth information 110 which is assumed to be included in the silhouettes of the same specific player. If the depth information 110 is not assumed to be the silhouette of the player, the flag is set so as to indicate information that the depth information 110 is not assumed to be the silhouette of the player. The player tracking unit 103 may be included in the bone structure tracking unit 104.

The bone structure tracking unit 104 recognizes the characteristic ends (e.g., the head, an arm, the body, a leg, or the like) of the player based on the depth information 110 (when necessary, the image information 109 may be used instead) stored in the memory 108. The bone structure tracking unit 104 presumes the positions of bones and joints inside the body of the player and traces movements of the positions of the bones (ossis) and the joints (arthro).

The gesture recognition unit 105 recognizes the gestures based on statistics information of the depth information 110 stored in the memory 108 (when necessary, the image information 109 may be used instead). At this time, the gesture recognition unit 105 uses the result of the tracking by the bone structure tracking unit 104 and the image is previously divided into plural sections (e.g., four sections). A detailed description of this is described later.

The sound recognition unit 106 recognizes sound using sound information received by the microphone 113.

The game progression control unit 107 controls a game progression based on results obtained by the bone structure tracking unit 104, the gesture recognition unit 105, and the sound recognition unit 106.

<Operations>

FIG. 3 is a flow chart illustrating exemplary processes of gesture recognition and game control. When there is plural players, the gesture recognition and the game control are performed for each player. The process illustrated in FIG. 3 is performed for each frame (e.g., a unit of updating screens for displaying game images).

Referring to FIG. 3, after the process is started in step S101, the gesture recognition unit 105 acquires the depth information 110 from the memory 108 in step S102.

Next, the gesture recognition unit 105 calculates dividing positions of the image of the depth information 110 in step S103.

Figure 4:
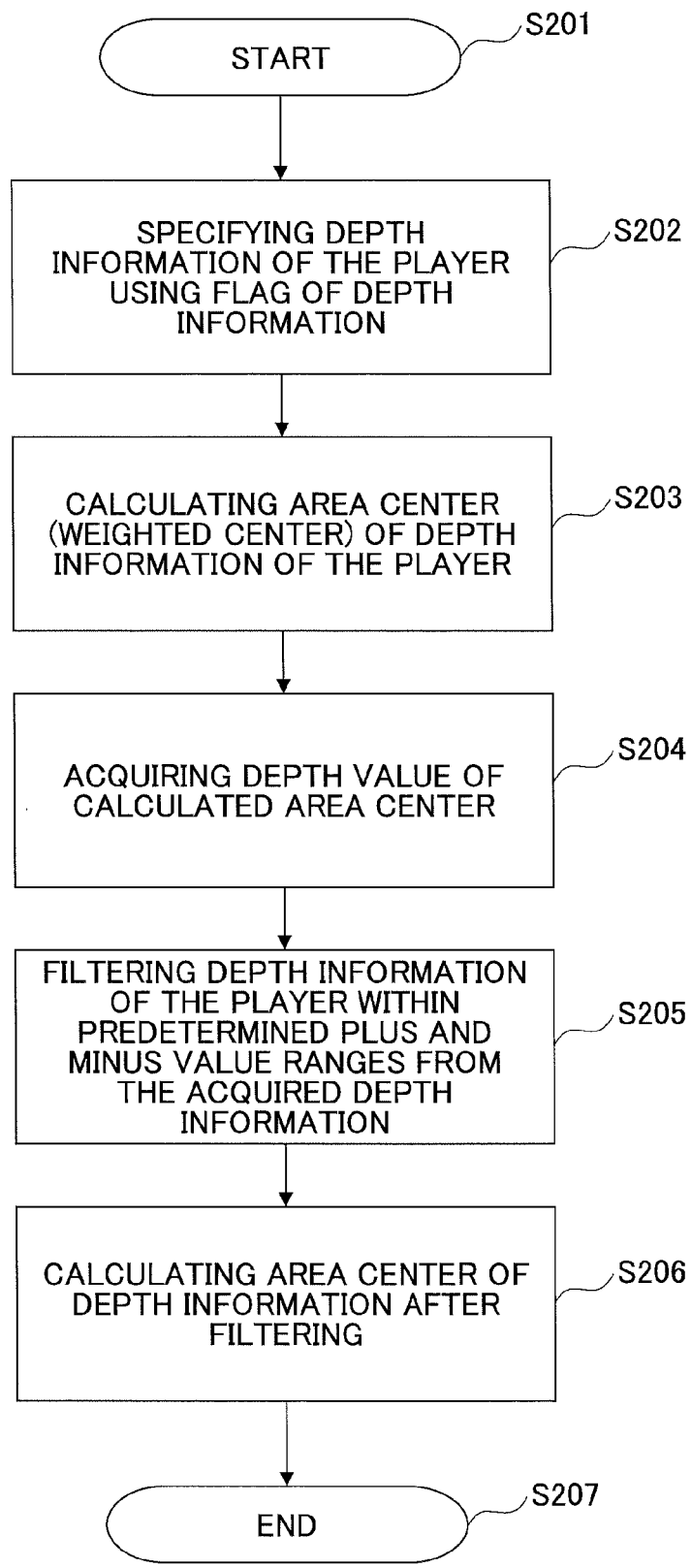
FIG. 4 is a flowchart illustrating an exemplary process of calculating dividing positions.

FIG. 4 is a flow chart illustrating an exemplary process of calculating the dividing positions (step S103 illustrated in FIG. 3). Here, one coordinate is acquired as the dividing position for dividing the image into four sections. Further, if the image of the depth information is divided into more sections, the number of the coordinate of the dividing position is made plural. For example, in a case of 2 (the lateral direction) by 4 (the longitudinal direction), the sections divided by the above dividing positions are further divided into two subsections in the longitudinal directions at new dividing positions.

In this case, for example, the vertically divided sections may be simply divided into two subsections. Instead, weighted centers of the sections may be determined based on area centers acquired from depth information of the sections, and the subsections are further divided at the weighted center on the ordinate. The upper section may be divided at the position of the neck on the upper body side, and at the position of the knees on the lower body side.

Referring to FIG. 4, after the process is started in step S201, the depth information of the player is specified using the flags of data of the depth information 110 in step S202.

Next, the area center (the weighted center) of the depth information of the silhouette of the player is calculated in step S203. For example, provided that the abscissa of the image is represented by a value x and the ordinate of the image is represented by a value y, values x and y of pieces of the depth information 110 corresponding to the player indicated by the flag are picked up. The sum of the values x is divided by the sum of the pieces of the depth information 110 to acquire the value on the abscissa (the x axis). The sum of the values y is divided by the sum of the pieces of the depth information 110 to acquire the value on the ordinate (the y axis).

Then, the depth value of the calculated area center is acquired in step S204. Said differently, the depth data of the depth information 110 corresponding to the coordinate of the area center are referred.

Next, the depth information 110 of the player residing within predetermined plus and minus value ranges from the acquired depth value is selected by filtering in step S205. The depth data are referred to filter the depth information 110 corresponding to the player indicated by the flag to remove the pieces of the depth information 110 without the predetermined value ranges. The filtering is provided to remove noises caused by an obstacle existing on front or back sides of the player.

Next, the area center of the depth information 110 after the filtering is calculated to acquire the dividing positions in step S206. Thereafter, the process is completed in step S207.

Referring back to FIG. 3, the gesture recognition unit 105 performs the area divisions of the image at the acquired dividing positions in step S104. Specifically, the acquired dividing positions are determined as the coordinate values for the area divisions.

Figure 5A:
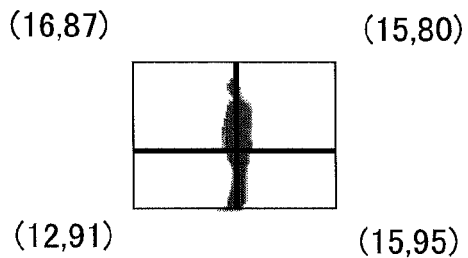
FIG. 5A illustrates an example of gesture recognition.
Figure 5B:
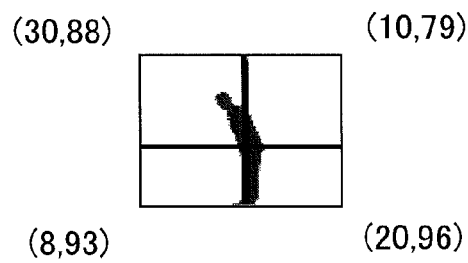
FIG. 5B illustrates another example of gesture recognition.

Next, the gesture recognition unit 105 calculates statistics information of the depth information 110 after the filtering for each divided section in step S105. FIGS. 5A and 5B illustrate examples of calculated statistics information. The statistics information for different postures are illustrated in FIGS. 5A and 5B. Referring to FIGS. 5A and 5B, two numbers are surrounded by case arcs on the four corners. The first number represents the area value (the number of the depth information 110 of the silhouette of the player in the corresponding section. The second number represents the average depth value (the average value of the depth values of the depth information 110) of the silhouette of the player in the corresponding section. The statistics information is not limited to the example.

Referring back to FIG. 3, the gesture recognition unit 105 stores the calculated statistics information inside the video game apparatus 1 in step S106.

Figure 5C:
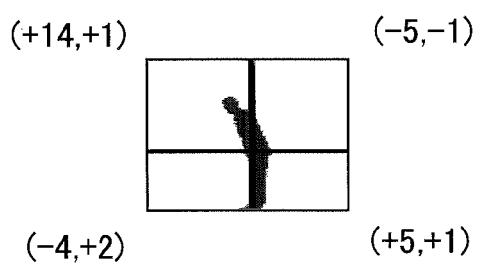
FIG. 5C illustrates another example of gesture recognition.

Next, the gesture recognition unit 105 calculates differences between the previously stored statistics information and currently stored statistics information for each divided section in step S107. FIG. 5C illustrates exemplary differences between the values of the previously stored statistics information at the four corners in FIG. 5A and the values of the currently stored statistics information at the four corners in FIG. 5B.

Referring back to FIG. 3, the gesture recognition unit 105 calculates the result of the gesture recognition based on the previously stored statistics information and the currently stored statistics information for each divided section and outputs the result to the game progression control unit 107 in step S108. Thereafter, the process returns to the acquiring the depth information in step S102. In the example illustrated in FIG. 5C, the area value of the upper left section decreases, and the area values of the upper right decreases, and the increments of the area values of the lower left and the lower right are small. Therefore, it is possible to recognize that the player bends his or her body in the left direction on FIG. 5C (the player bows). The amount of the bowing is proportional to the increment of the area value of the upper left section. The amount may further include the decrement (the sign inversion of the increment) of an area value of the upper right section. The difference of the average value of the depth values may be included in calculating the result of the gesture recognition.

Referring back to FIG. 3, after the game progression control unit 107 acquires the result of the gesture recognition, the game progression control unit 107 corrects the result in conformity with a correction parameter previously acquired in response to the types of the gestures in step S109. For example, when bowing and rolling back are compared, the degrees of the rolling back are ordinarily lesser than the degrees of the bowing for many players. If similar degrees of operations are required between the bowing and the rolling back as in a surfboard game, the operations in the bowing and the operations in the rolling back do not conform depending on the result of the gesture recognition. Therefore, a correction parameter may be calculated using the result of the gesture recognition in the bowing and the rolling back. By multiplying the result of the gesture recognition by the correction parameter, the result of the gesture recognition in the rolling back can be corrected. Thus, the operations corresponding to the bowing and the rolling back can become even relative to the bowing and the rolling back. When the correction parameter for correcting the bowing and the rolling back and the correction is applied, in order to determine whether the player bows or rolls back, it is necessary to know the facing direction (left or right) of the player. In order to determine the direction of the player, it is possible to use information output by the bone structure tracking unit 104. The bone structure tracking unit 104 successively understand three dimensional positions of the bones and joints of the player. Therefore, it is possible to determine the facing direction (right or left) of the player relative to the direction of the depth sensor. Detailed calculation of the correction parameter is described later.

Figure 6A:
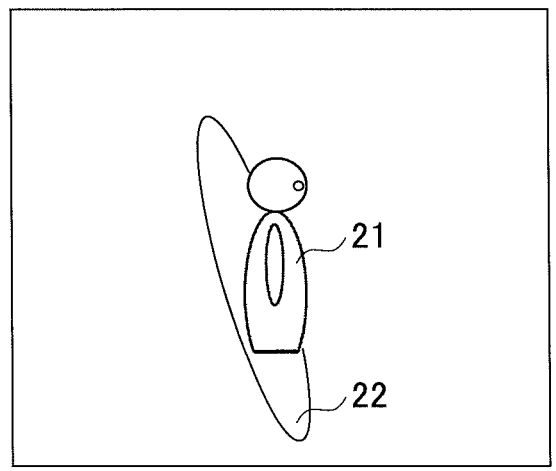
FIG. 6A illustrates an example of game control.
Figure 6B:
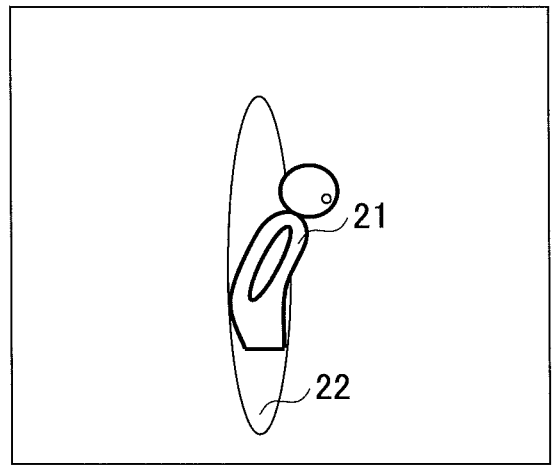
FIG. 6B illustrates another example of game control.

Next, the game progression control unit 107 controls game progression based on the result of the gesture recognition (if a correction is done, the result of the gesture recognition after the correction) in stop S110. FIGS. 6A and 6B illustrate exemplary game control. Referring to FIGS. 6A and 6B, a character 21 riding on a surfboard 22 moves in association with movement of a player. If the posture of the player illustrated in FIG. 5A corresponds to a game screen illustrated in FIG. 6A, when the player bows as illustrated in FIG. 5A, the character 21 bows as illustrated in FIG. 6B. Then, the surfboard 22 can be turned rightward.

FIG. 7 is a flowchart illustrating an exemplary process of calculating the correction parameter used in correcting the game control (Step S109 in FIG. 3). The process can be done during loading a program, before starting the game, or the like.

Figure 8A:
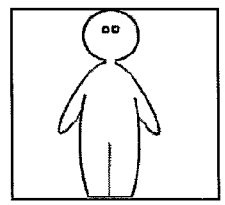
FIG. 8A illustrates an exemplary screen used for calculating a correction parameter (the first drawing).

Referring to FIG. 7, the process is started in step S301. A specific screen is displayed to prompt a player to face forward and be erect in step S302. FIG. 8A is an exemplary screen in which a character faces forward and is erect. It is possible to simultaneously display a message such as "please face forward and be erect for correction". Measurement of the player while the player faces forward and is erect is to acquire data of a reference position and is not used to calculate the correction parameter. Therefore, it is possible to omit the measurement of the player while the player faces forward and is erect. The omission is similar in step S303.

Next, the process moves back to FIG. 7. In step S303 (steps S304 to S307), depth information is acquired, a dividing position is calculated, an area is divided, and statistics information of the depth information is calculated and/or stored for each divided section. Here, the acquiring the depth information (step S304) is a process similar to the acquiring the depth information (step S102). The calculation of the dividing position (step S305) is similar to the calculation of the dividing position (step S103). Details of the calculation are as illustrated in FIG. 4. The area division in step S306 is similar to the area division (step S104) illustrated in FIG. 3. Calculating and storing the statistics information of depth information for each divided section in step S307 are a process similar to the calculating the statistics information of the depth information for each divided section in step S105 and the storing the statistics information in step S106. An example of the statistics information to be acquired is illustrated in FIG. 8B.

Figure 8B:
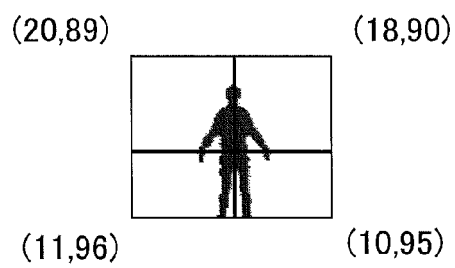
FIG. 8B illustrates exemplary calculation information (statistics information) used for calculating the correction parameter (the first drawing).

As an example of the statistics information, number strings (20,89), (18,90), (11,96), and (10,95) are illustrated at four corners in FIG. 8B. These number strings indicate area values and average depth values of four divided sections as in FIGS. 5A, 5B, and 5C. Number strings in FIGS. 8E, 8F, 9D, and 9H also indicate area values and average depth values of four divided sections.

Figure 8C:
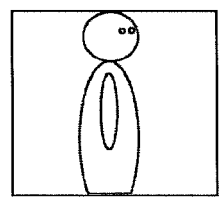
FIG. 8C illustrates another exemplary screen used for calculating the correction parameter (the first drawing).
Figure 8D:
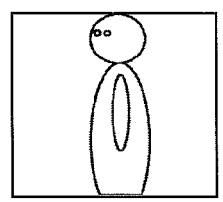
FIG. 8D illustrates another exemplary screen used for calculating the correction parameter (the first drawing).

Referring back to FIG. 7, a screen is displayed for prompting the player to face sideways and be erect (to face sideways in an erect posture) in step S308. FIGS. 8C and 8D illustrate exemplary screens where the character faces sideways and is erect. In FIG. 8C, the player is in a regular stance (The left foot is in the forward direction). In FIG. 8D, the player is in a goofy stance (The right foot is in the forward direction). The screen of FIG. 8C or FIG. 8D may be selected. Instead, a screen may be configured to be used both the regular stance and the goofy stance. In addition, a message such as "please face sideways and be erect (face sideways in an erect posture)" can be displayed.

Figure 8E:
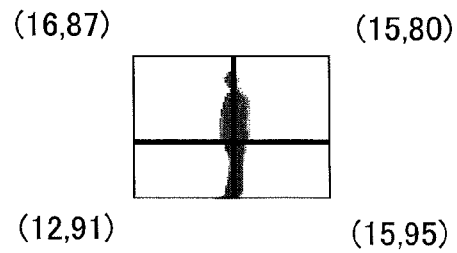
FIG. 8E illustrates exemplary calculation information (statistics information) used for calculating the correction parameter (the first drawing).
Figure 8F:
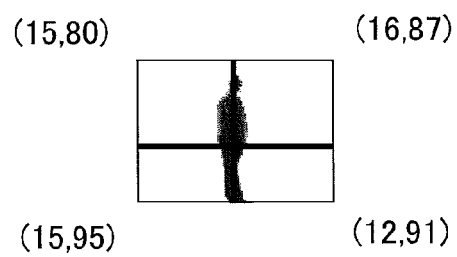
FIG. 8F illustrates exemplary calculation information (statistics information) used for calculating the correction parameter (the first drawing).

Next, referring back to FIG. 7, the depth information is acquired, the dividing position is calculated, the area is divided, and the statistics information of the depth information is calculated and/or stored for each divided section in step S309. Step S309 is a process similar to step S303 (steps S304 to S307). An example of the statistics information to be acquired is illustrated in FIGS. 8E and 8F. To deal with a case where the player does not face the prompted direction, information of the player's direction may be simultaneously acquired from information output by the bone structure tracking unit 104 or the like and/or stored.

Figure 9A:
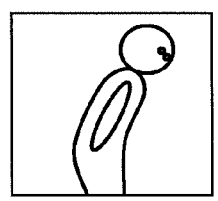
FIG. 9A illustrates an exemplary screen used for calculating the correction parameter (the second drawing).
Figure 9B:
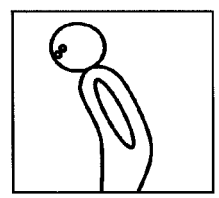
FIG. 9B illustrates another exemplary screen used for calculating the correction parameter (the second drawing).

Referring back to FIG. 7 again, a screen is displayed for prompting the player to bow in step S310. FIGS. 9A and 9B are exemplary screens in which the character bows. FIG. 9A illustrates the player in the regular stance. FIG. 9B illustrates the player in the goofy stance. In addition, a message such as "please roll forward (bow) maximally" can be displayed.

Figure 9C:
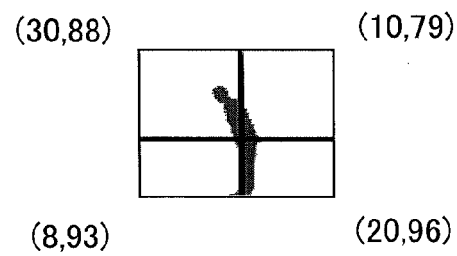
FIG. 9C illustrates exemplary calculation information (statistics information) used for calculating the correction parameter (the second drawing).
Figure 9D:
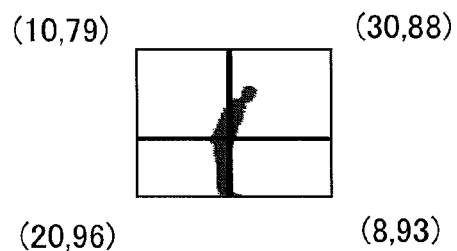
FIG. 9D illustrates exemplary calculation information (statistics information) used for calculating the correction parameter (the second drawing).

Next, referring back to FIG. 7, the depth information is acquired, the dividing position is calculated, the area is divided, and the statistics information of the depth information is calculated and/or stored for each divided section in step S309. Step S311 is a process similar to step S303 (steps S304 to S307). An example of the statistics information to be acquired is illustrated in FIGS. 9C and 9D.

Figure 9E:
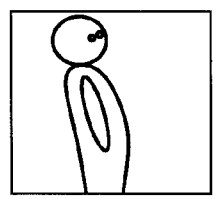
FIG. 9E illustrates another exemplary screen used for calculating the correction parameter (the second drawing).
Figure 9F:
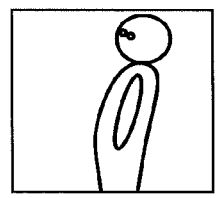
FIG. 9F illustrates another exemplary screen used for calculating the correction parameter (the second drawing).

Next, referring back to FIG. 7, a screen is displayed for prompting the player to roll back in step S312. FIGS. 9E and 9F are exemplary screens in which the character rolls back. FIG. 9E illustrates the player in the regular stance. FIG. 9F illustrates the player in the goofy stance. In addition, a message such as "please roll back maximally" can be displayed.

Figure 9G:
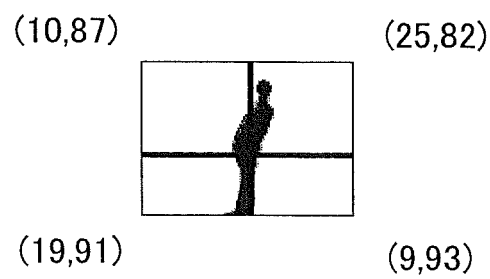
FIG. 9G illustrates exemplary calculation information (statistics information) used for calculating the correction parameter (the second drawing).
Figure 9H:
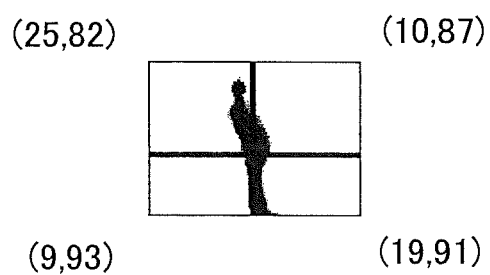
FIG. 9H illustrates exemplary calculation information (statistics information) used for calculating the correction parameter (the second drawing).

Next, referring back to FIG. 7, the depth information is acquired, the dividing position is calculated, the area is divided, and the statistics information of the depth information is calculated and/or stored for each divided section in step S313. Step S313 is a process similar to step S303 (steps S304 to S307). An example of the statistics information to be acquired is illustrated in FIGS. 9G and 9H. To deal with a case where the player does not face the prompted direction, information of the player's direction may be simultaneously acquired from information output by the bone structure tracking unit 104 or the like and/or stored.

Next, referring back to FIG. 7, a difference between the statistics information acquired when the player facing sideways and being erect and the statistics information acquired when the player bowing and a difference between the statistics information acquired when the player facing sideways and being erect and the statistics information acquired when the player rolling back. Thereafter, a correction parameter is calculated in step S314. Whether the bowing or the rolling back is determined may depend on the contents prompted at the time of acquiring the statistics information, or may be determined based on the contents and further the acquired and/or stored information of the direction of the player.

For example, in a case where the statistics information illustrated in FIGS. 8E, 9C, and 9G are acquired, the correction parameter is acquired as follows. The correction parameter may be obtained by dividing the increment of the area value in the upper left section (FIGS. 8E and 9G) by the increment of the area value in the upper right section (FIGS. 8E and 9C). To the increment of the area value in the upper right section in FIGS. 8E and 9G, the decrement (the sign inversion of the increment) of the area value in the upper right section may be added. To the increment of the area value in the upper left section in FIGS. 8E and 9C, the decrement (the sign inversion of the increment) of the area value in the upper left section may be added.

Referring back to FIG. 7, thereafter, the process is completed in step S315.

Although the correction parameters for the bowing and the rolling back are described above, the correction can be applied not only to the above examples. For example, a correction parameter for the reach of punch or a correction parameter for the height of kick may be calculated.

<Summarization>

According to the embodiments, regardless of the direction of the player, the gesture can be accurately recognized and the correction required by characteristics of areas of body can be appropriately carried out.

As described, the present invention is described using the preferred embodiments of the present invention. Although the invention has been described with respect to specific embodiments, various modifications and changes may be added to the embodiments within extensive points and ranges of the present invention defined in the scope of claims. Said differently, the present invention should not be limited to details and appended drawings of the embodiments.

This international application is based on Japanese Priority Patent Application No. 2010-135609 filed on Jun. 14, 2010, the entire contents of Japanese Priority Patent Application No. 2010-135609 are hereby incorporated herein by reference.

EXPLANATION OF REFERENCE SYMBOLS

1: video game apparatus;
101: control unit;
102: camera and depth sensor control unit;
103: player tracking unit;
104: bone structure tracking unit;
105: gesture recognition unit;
106: sound recognition unit;
107: game progression control unit;
108: memory;
109: image information;
110: depth information;
111: camera;
112: depth sensor;
113: microphone;
114: image output unit;
115: sound output unit;
116: communication unit;
117: monitor; and
118: speaker.

The invention claimed is:

1. A video game apparatus comprising:
a depth sensor configured to capture an area where a player exists and acquire depth information for each pixel of an image including a silhouette of the player; and
a gesture recognition unit configured
to divide the image so as to divide the silhouette of the player into a plurality of sections of the image,
to calculate statistics information for each of the plurality of sections, and
to recognize a gesture of the player based on the statistics information, the statistics information including
an area value, which is a ratio of an area occupied by a divided part of the silhouette of the player in the corresponding section relative to an area of the corresponding section, and
depth information of the divided part of the silhouette of the player in the corresponding section.

2. The video game apparatus according to claim 1, wherein the gesture recognition unit calculates an area center of the silhouette of the player in the image and divides the image into the plurality of sections.

3. A non-transitory video game controlling program causing a computer to execute the steps of:
capturing, by a depth sensor of a video game apparatus, an area where a player exists and acquiring, by the depth sensor, depth information for each pixel of an image including a silhouette of the player; and
dividing, by a gesture recognition unit of the video game apparatus, the image so as to divide the silhouette of the player into a plurality of sections of the image, calculating, by the gesture recognition unit, statistics information for each of the plurality of sections, and recognizing, by the gesture recognition unit, a gesture of the player based on the statistics information, the statistics information including an area value, which is a ratio of an area occupied by a divided part of the silhouette of the player in the corresponding section relative to an area of the corresponding section, and depth information of the divided part of the silhouette of the player in the corresponding section.

4. A video game controlling method comprising:
capturing, by a depth sensor of a video game apparatus, an area where a player exists and acquiring, by the depth sensor, depth information for each pixel of an image including a silhouette of the player; and
dividing, by a gesture recognition unit of the video game apparatus, the image so as to divide the silhouette of the player into a plurality of sections of the image, calculating, by the gesture recognition unit, statistics information for each of the plurality of sections, and recognizing, by the gesture recognition unit, a gesture of the player based on the statistics information, the statistics information including an area value, which is a ratio of an area occupied by a divided part of the silhouette of the player in the corresponding section relative to an area of the corresponding section, and depth information of the divided part of the silhouette of the player in the corresponding section.

5. The video game apparatus according to claim 1, wherein the gesture recognition unit prompts the player to take a plurality of postures and calculates a correction parameter for individual postures.

* * * * *